Sept. 24, 1974     L. M. SYMONS     3,837,967
APPARATUS FOR THE APPLICATION OF A SINGLE
STRIP TREAD TO A CARCASS
Original Filed Aug. 13, 1970     9 Sheets-Sheet 1
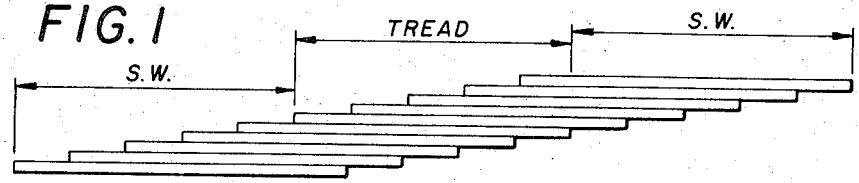
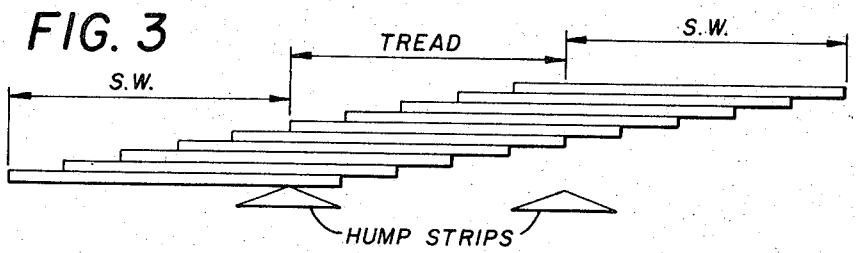
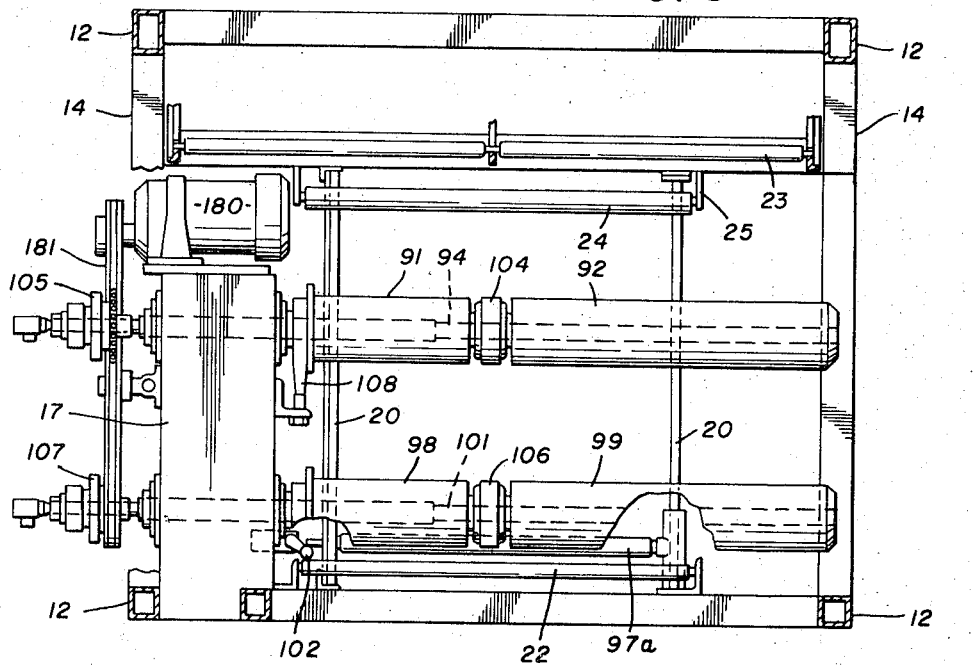
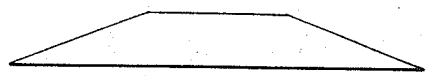
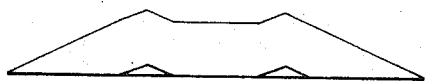

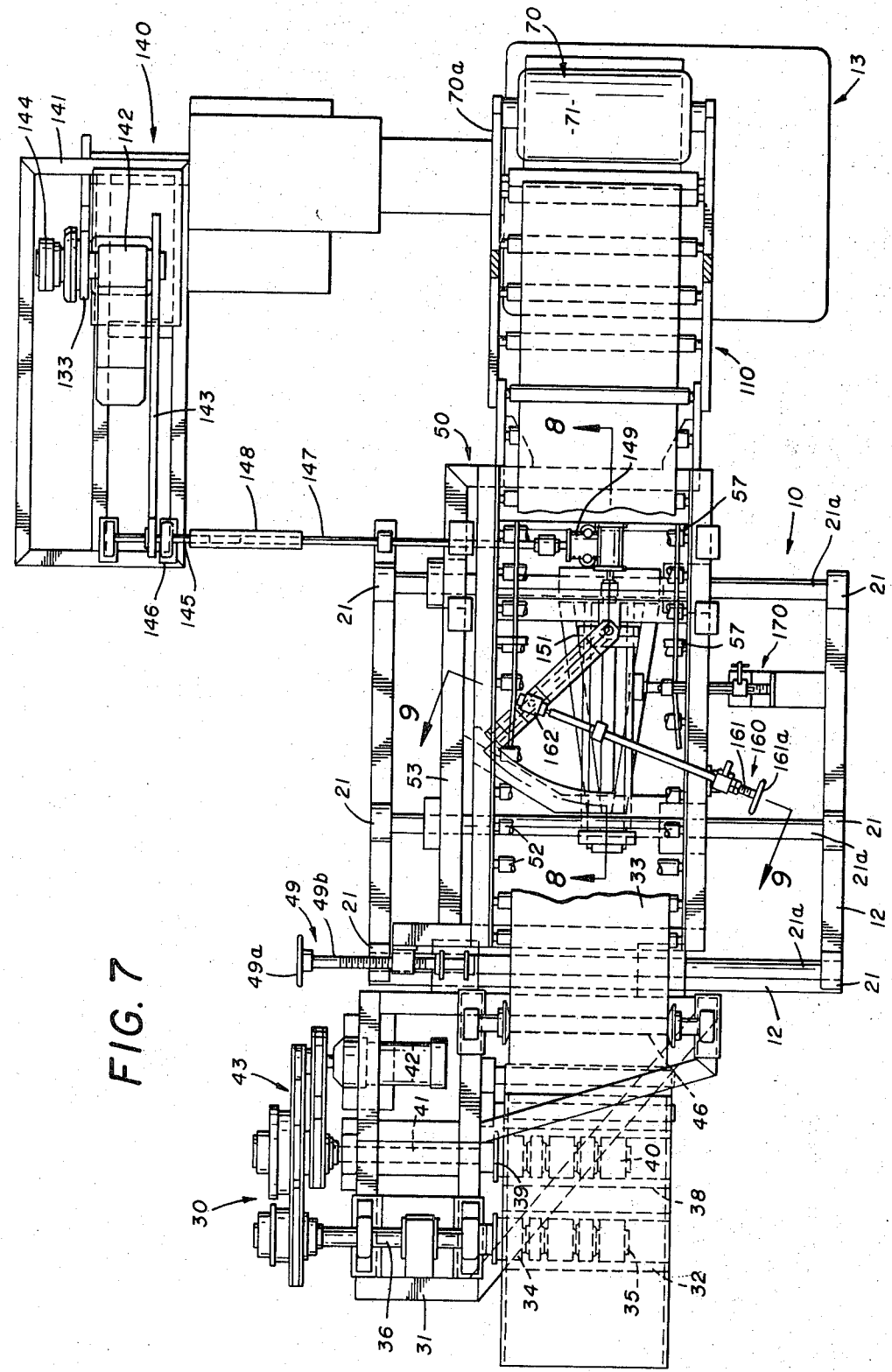

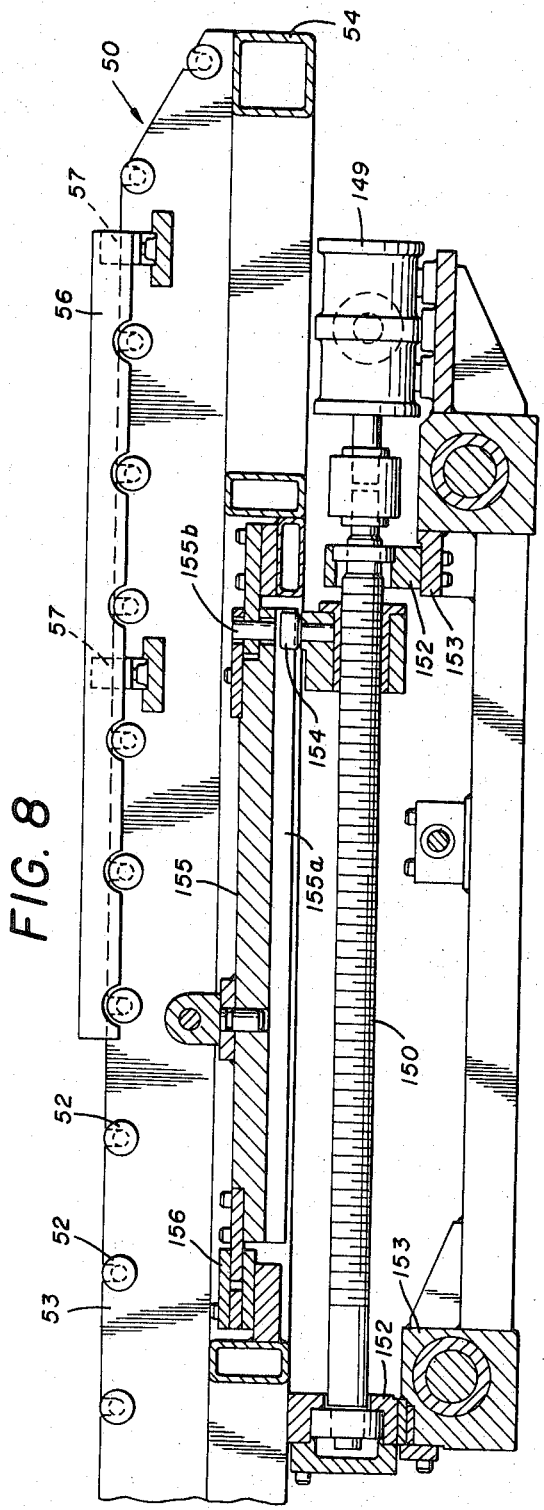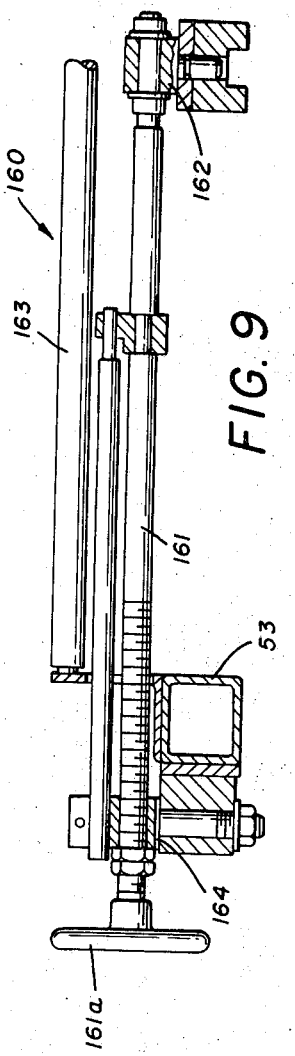

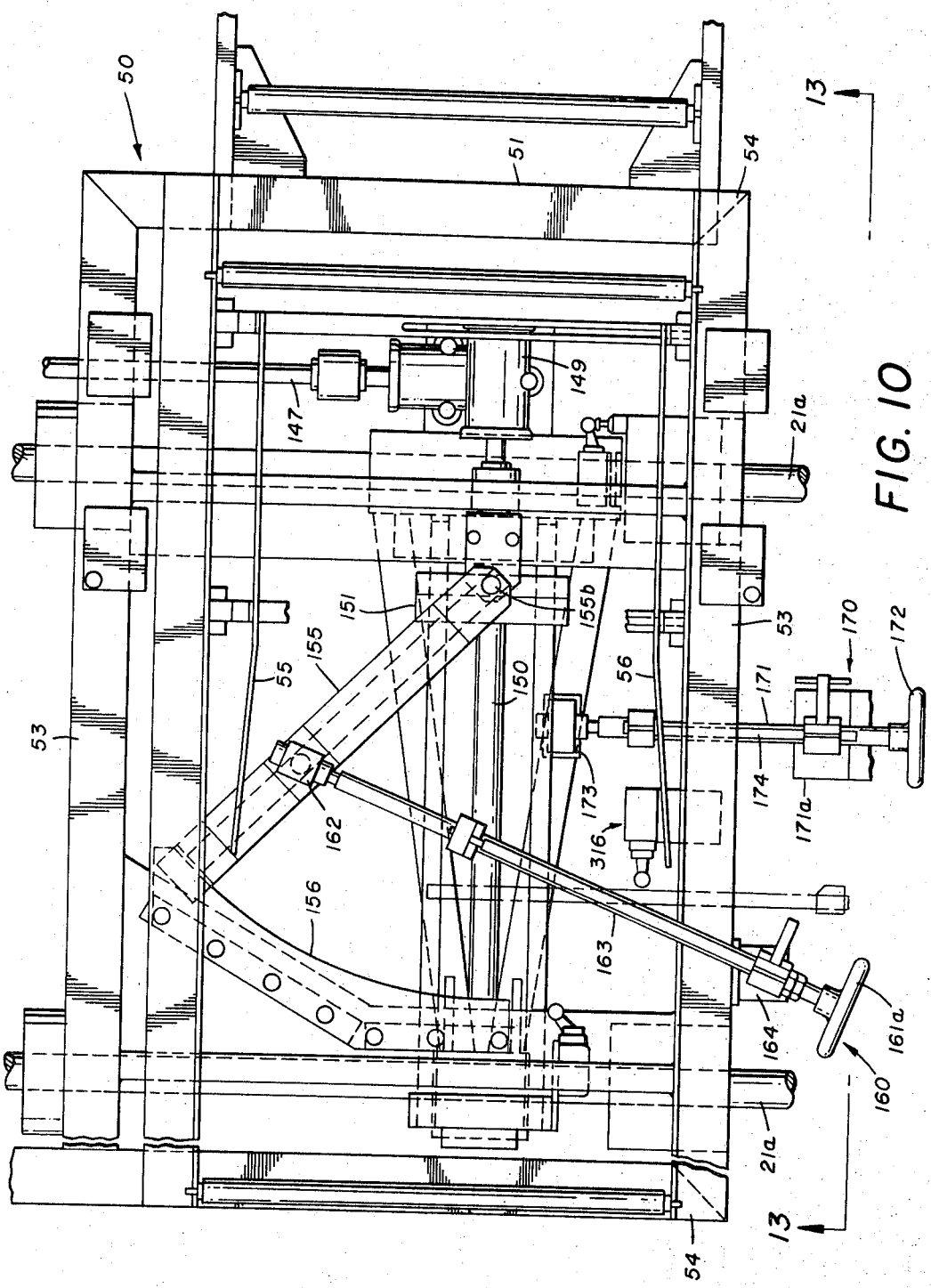

United States Patent Office 3,837,967
Patented Sept. 24, 1974

3,837,967
APPARATUS FOR THE APPLICATION OF A SINGLE STRIP TREAD TO A CARCASS
Lester M. Symons, Southfield, Mich., assignor to Uniroyal, Inc., New York, N.Y.
Original application Aug. 13, 1970, Ser. No. 63,407, now abandoned. Divided and this application Oct. 19, 1972, Ser. No. 298,919
Int. Cl. B29h 17/02, 17/08, 17/10
U.S. Cl. 156—405                    4 Claims

ABSTRACT OF THE DISCLOSURE

An apparatus for applying an endless single strip tread to the carcass of a tire in either toroidal or flat built unshaped form. An uncured rubber strip of tread material is applied to the tire carcass in substantially parallel, spaced, spiral convolutions by moving a movable conveyor assembly and the supply source for the tread material in a direction parallel to the axis of the tire carcass itself. The movement is in one direction only during application of the strip, and a constant step-off of the strip as it is applied to the tire carcass is obtained by control means which permit the speed of transverse travel of the conveyor assembly and the rotational speed of the tire carcass to be controlled according to a predetermined formula so that the tread is applied to the tire in a single pass of the movable conveyor and tread stock supply source. The apparatus also includes means for returning the conveyor assembly to its starting position automatically following completion of application of the strip to the tire. The apparatus also includes provision of a hump stock let-off device which can be utilized when a "valley" type tread contour is required. A stitcher is also utilized to stitch down the tread stock during the time that the device moves relatively of the tire body, and finally the method and apparatus is utilizable with any conventional tire-building machine or recapping machine, since the method and apparatus disclosed herein is utilizable either in applying a tread to a new tire carcass or in retreading a used tire.

RELATED APPLICATIONS

This is a division of application Ser. No. 63,407, filed Aug. 13, 1970, which is now abandoned.

BACKGROUND OF THE INVENTION

This invention relates in general to the manufacture of pneumatic tires, and more particularly to an apparatus for applying an endless strip of elastomeric material onto a tire carcass.

The conventional method of forming a tread is to extrude a solid strip of rubber to the desired cross-sectional configuration of the tread, following which the extrusion is cut to its proper length, stored, and eventually applied to the tire.

This conventional method has certain disadvantages, among which are the expense of the extruding equipment; the difficulty of maintaining the exact cross-sectional contour during extrusion; the difficulty in controlling both the cross-section and the length of the tread following the cutting operation to avoid shrinkage; the problem of cost and space for storage; the difficulty in obtaining and maintaining a secure splice at the ends of the tread; and finally the difficulty in holding close tolerances in the tread area.

The improved method and apparatus disclosed herein represents an attempt to either eliminate or drastically reduce the seriousness of the aforementioned difficulties.

DESCRIPTION OF THE PRIOR ART

The following prior art is known to applicant:

Darrow, U.S. Pat. 1,335,879
Hanson, U.S. Reissue Pat. 25,349
Holman, U.S. Pat. 3,177,918
Guichon et al., U.S. Pat. 3,268,380
Bailey et al., U.S. Pat. 3,270,107
Glasby et al., U.S. Pat. 3,330,186
Gallagher, U.S. Pat. 3,421,958
Weitzel, U.S. Pat. 3,422,874.

The above prior art shows a variety of methods of applying an endless strip of material to various surfaces. For example, both Holman U.S. Pat. 3,177,918 and Hanson U.S. Reissue Pat. 25,349 disclose methods for building a tread on a pneumatic tire by applying an endless strip of rubber thereto.

These devices, while apparently being directed to achieving a somewhat similar end result to that of applicant, are believed to be somewhat less desirable because of their specific construction and operation.

Thus, for example, in Holman a retreading machine has been disclosed which operates by utilization of an oscillating sector gear, which moves the stitching apparatus and the stock supply apparatus back and forth in an oscillating fashion. Holman accordingly does not achieve the constant step-off achieved by applicant together with the ability to build the tread on the tire body in one pass in a uni-directional mode of operation with a constant step-off.

Hanson also differs from applicant's structure in the method of control which primarily contemplates the use of a template and stylus rather than a positive control device.

SUMMARY OF THE INVENTION

The general object of the invention is to provide a means for applying a single strip of tread stock to the periphery of a tire carcass in a single pass across the surface of the tire, with a constant step-off as the strip is spirally wound onto the carcass.

A further object is to provide an improved apparatus for building a tread which is both fast and economical and also provides improved quality control.

These objects are accomplished by providing a main frame, upon which is mounted a supply source for the tread stock, and a movable conveyor, both of which are movable transversely of the frame.

A building drum of any of a number of conventional types is located at one end of the frame and, by means of unique control means, the speed with which the movable conveyor and the supply source move across the frame is correlated to the rotational speed of the drum, whereby a predetermined number of layers with a fixed step-off between them is deposited on the drum in a spiral configuration to achieve a predetermined tread configuration.

Operation of the device is further enhanced by providing a stitcher mechanism which moves with the supply source and the movable conveyor to stitch the strip down onto the tire carcass as it is wound thereon.

Accordingly, an apparatus for applying a single strip of rubber to a tire carcass to form a tread becomes the principal object of this invention, with other objects thereof becoming more apparent upon a reading of the following brief specification considered and interpreted in view of the accompanying drawings.

Of the drawings:

FIG. 1 is a diagrammatic view of a laminate of layers of tread rubber in constant stepped-off relation in accordance with one phase of the invention.

FIG. 2 is a diagrammatic view on a reduced scale showing the final contoured shape of the laminate of FIG. 1.

FIG. 3 is a view similar to FIG. 1 with the addition of a pair of filler strips intended to form a "valley" type tread in accordance with another phase of the invention.

FIG. 4 is a view similar to FIG. 2 showing the final contoured "valley" shape of the FIG. 3 laminate.

FIG. 6 is a sectional view taken on the lines 6—6 of FIG. 5 showing the filler strip mechanism.

FIG. 7 is a plan view of the overall apparatus shown in FIG. 5 partially broken away and with part of the stitcher applicator and the filler strip mechanism removed for clarity.

FIG. 8 is an enlarged sectional view taken on the lines 8—8 of FIG. 7.

FIG. 9 is an enlarged sectional view taken on the lines 9—9 of FIG. 7.

FIG. 10 is an enlarged plan view of the traversing mechanism with the conveyor rolls removed for clarity.

BRIEF DESCRIPTION OF THE PREFERRED EMBODIMENT

Figure 5:
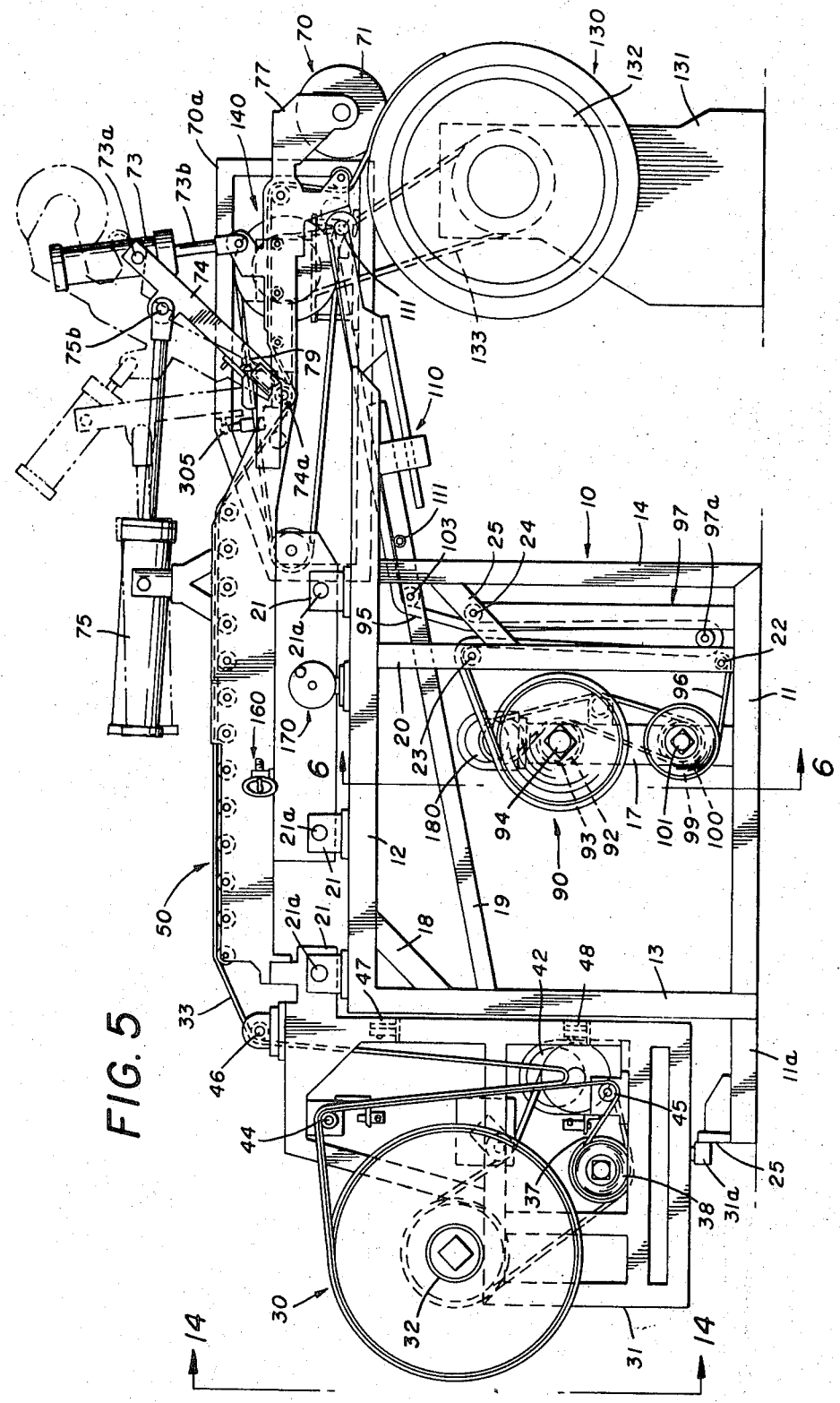
FIG. 5 is a side elevational view of the improved apparatus for single strip tread winding, showing the stitcher applicator in broken lines in the retracted position.
Figure 11:
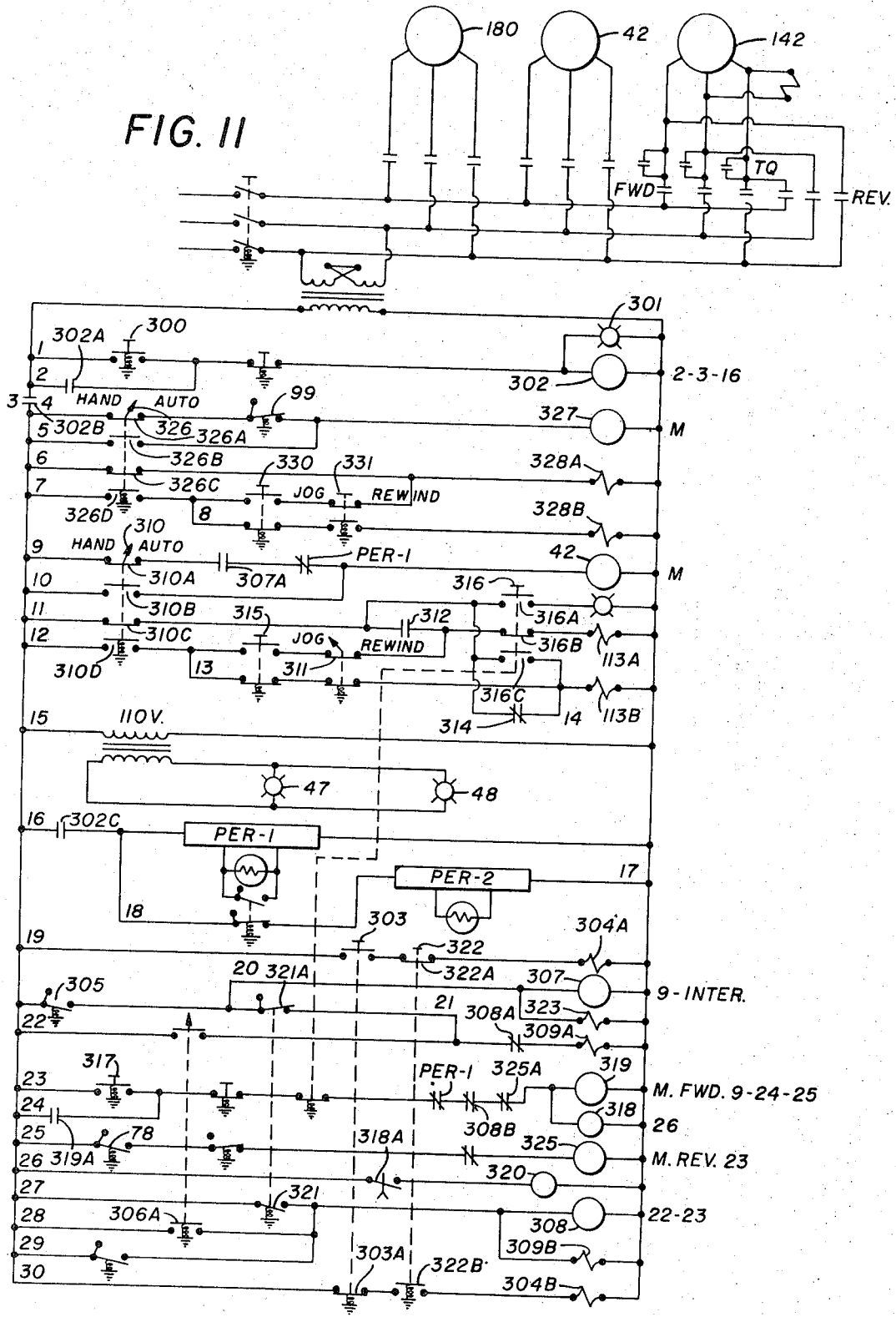
FIG. 11 is an elementary schematic electrical diagram showing the means for controlling the sequence of operations of the strip-winding process.
Figure 12:
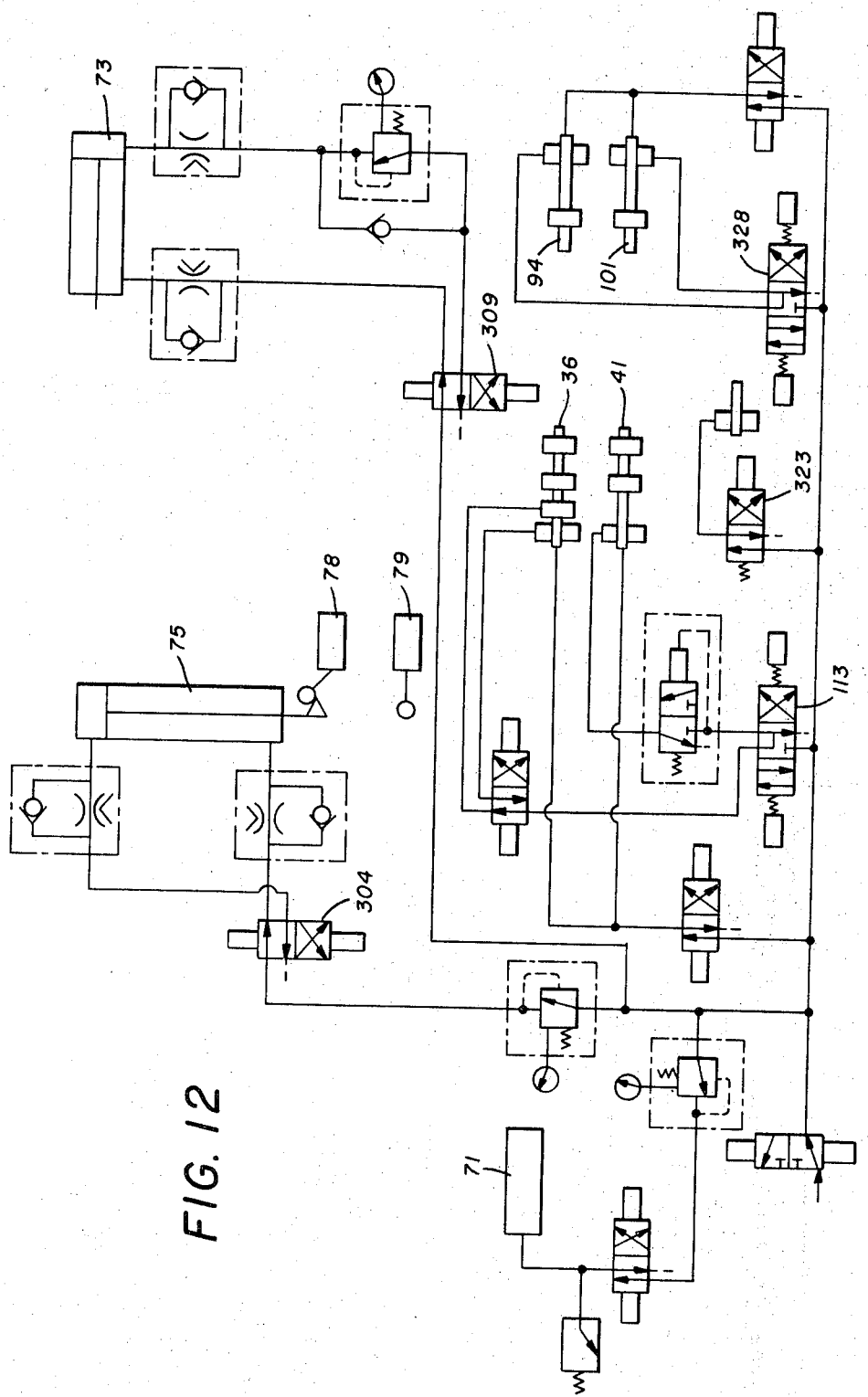
FIG. 12 is a schematic pneumatic diagram showing the valving system for controlling the various devices during operation of the process.
Figure 13:
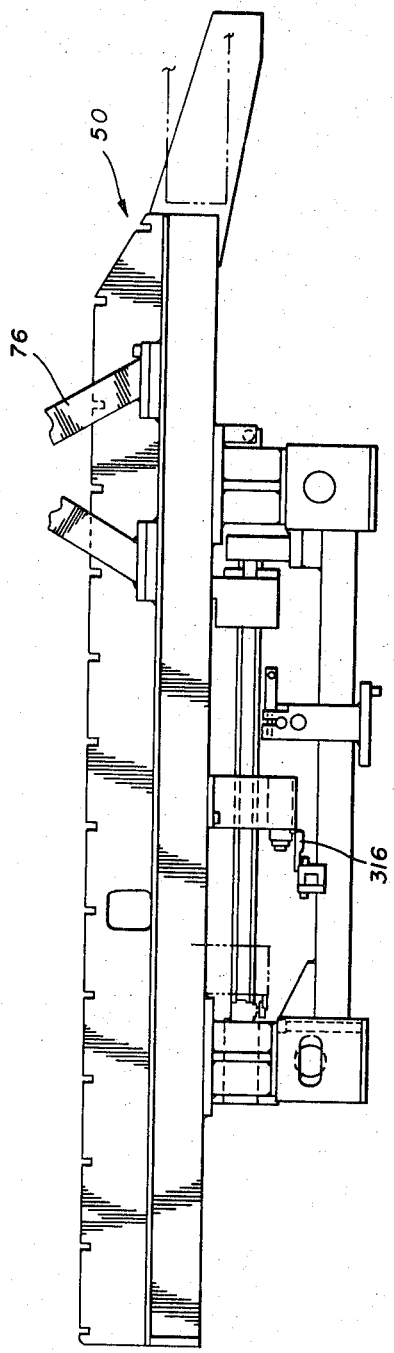
FIG. 13 is a view taken along the lines 13—13 of FIG. 10.

The overall apparatus for practicing the invention is best shown in FIGS. 5 and 7 of the drawings and includes a main frame 10; a tread stock let-off mechanism 30 which is mounted on one end of the main frame for movement transversely thereof; a movable conveyor assembly 50 also mounted on the main frame for movement relatively thereof in unison with the tread stock let-off means 30; and a stitching means 70 which is also carried by the main frame and moves in unison with the tread stock let-off and the movable conveyor 50. The overall device also includes a filler stock let-off means 90 carried by the main frame and a fixed or stationary conveyor 110 associated therewith. Finally, the device includes a conventional building drum 130; control means 160 and 170; and a drive means 140 which drives both the drum and the movable conveyor.

The individual sub-assemblies just referred to as well as their specific mechanisms and their specific interrelationships with each other will be described separately and in detail below. It is, however, believed appropriate to briefly describe the overall operation of the device in a broad manner at this point. Accordingly then, the general operation of the device is as follows.

First, the ply stock or tire carcass is built up on the building drum means 130 in conventional fashion. Following this, the tread stock 33 is unwound from the tread stock roll 32 of the tread stock let-off means 30, threaded across the movable conveyor assembly 50 and down onto its starting point on the tire building mechanism 130.

The exact number of convolutions desired is computed by a method which will be subsequently described in detail, and the various adjustment means associated with the movable conveyor assembly 50 will be set to provide the desired relationship between the traverse of the tread stock let-off 30, movable conveyor 50, and stitcher 70 with regard to the peripheral speed of the drum rotation so as to achieve the exact number of convolutions and the precise amount of step-off desired to obtain the necessary tread configuration.

Once the strip of tread stock 33 has been started on the tire, the stitching mechanism 70 is actuated and brought from the broken line position of FIG. 5 to the full line position thereof. Following this, the entire traversing mechanism is actuated and the device will move across the main frame 10, feeding the necessary number of convolutions onto the drum and automatically stopping at the outward limit of its travel which has been predetermined. After the strip material has been cut, the mechanism is returned to the start position automatically upon raising the stitching means to the full line position of FIG. 5.

Following this, the finished tire can be taken from the drum. When a valley-type tread is desired, such as shown in FIGS. 3 and 4 of the drawings, the filler strip let-off mechanism 90 is employed in conjunction with the fixed conveyor 110 to apply this filler stock to the tire carcass before the tread stock is applied.

Accordingly then, the overall apparatus disclosed provides a device for applying an endless uncured rubber strip to a tire carcass in spiral convolutions with a predetermined step-off on each convolution that is held constant, with the entire tread being applied in a single pass across the surface of the tire.

While the sub-combinations and overall operation of the assembly having been described in a general fashion, the following will be a detailed description of each sub-combination and its relationship to the overall structure.

THE MAIN FRAME 10

The main frame 10 consists of a pair of parallel spaced-apart bottom support members 11 which are mounted on the factory floor in conventional fashion. The frame also includes parallel spaced-apart rear upright braces 13, 13 and forward upright braces 14, 14. The frame 10 also includes spaced-apart top support rails 12, 12 so as to form a generally cube-like skeleton frame to support the remaining sub-assemblies of the overall combination. Conventional bracing means, such as 18, 19, and 20, are also employed for strength and rigidity, with bracing means 19 also supporting the stationary conveyor 110.

The main frame 10 also includes a series of opposed pillow blocks 21, 21 on top rails 12, 12 which hold transverse rods 21a, 21a upon which the movable conveyor 50 and the tread stock applying apparatus 30 are journaled to facilitate their transverse movement.

The main frame 10 also has associated therewith extensions 11a, 11a of its bottom support members 11, 11 which project to the rear of the unit underneath the tread stock let-off means 30. This extension includes a pair of parallel bars secured to the floor and has a transverse plate 25 spanning the distance therebetween for purposes which will be described in greater detail below.

HUMP STRIP LET-OFF ASSEMBLY 90

Turning next then to FIGS. 5 and 6 for a more detailed description of the filler strip let-off, it will be noted first that the same is only used when a "valley" tread contour, such as shown in FIGS. 3 and 4, is desired.

The assembly, which is mounted either on the main frame 10 or directly on the floor, includes a pair of axially-spaced shells 91 and 92 adapted to carry the filler stock rolls 93, 93 which are, in turn, carried by and project from the upright support 17. These shells are journaled on shaft 94 which is driven by a motor 180 and chain and sprocket means 181, also carried on the upper end of the support 17, to drive the shells 91 and 92.

The filler stock material 95 which is in two strips is, of course, carried on the rolls 93, 93 together with a separating material 96, such as polyethylene, in well known fashion.

Also carried on and projecting from the upright support 17 is a second rotatable shaft 101 upon which are journaled shells 98 and 99 which receive take-up rolls 100, 100 to receive the separating material 96. This apparatus is, of course, mounted beneath the filler stock material supply means on support 17.

Rotatably mounted between the braces 20, 20 of the main frame 10 are conveyor rolls 22 and 23. A third conveyor roll 24 is also rotatably journaled between the braces 25, 25 of the main frame.

The filler strip stock 95 and the separating material 96 are first directed from the supply roll 93 over the roller 23. The separating material 96 is then directed under the roll 22 and onto the take-up roll 100, while the filler stock material is directed through a festoon 97 beneath a festoon roll 97a and up over the roll 24. In this way, since the take-up roll 100 is driven, there is virtually no tension on the filler strip material 95 during unwinding, with the separating material 96 bearing most of the tension.

The filler strip stock 95 is then directed over the first roll 103 which is carried by the main frame 10, and onto the fixed conveyor 110 which projects from the front of the main frame 10. For convenience of illustration in FIG. 5, only the first and last conveyor rolls 111, 111 of conveyor 110 are illustrated, with it being understood that a conventional conveyor is contemplated.

The motor 180 and chain and sprocket means 181, which operate the filler strip let-off mechanism, are automatically stopped when the lower festoon roll 97a reaches its lowest desired position, at which time the lower limit switch 102 (see FIG. 6) is actuated.

It should be noted that both the shaft 94, which carries the stock rolls 93, 93, and the shaft 101, which carries the take-up rolls 100, 100 are split into two parts so that each strip can, if desired for any reason, be threaded separately and then locked together by conventional clutch assemblies 104, 105 and 106, 107 or similar devices for simultaneous rotation.

Furthermore, a brake 107 is provided in conjunction with the shaft 94 which carries rolls 93, 93 to prevent excessive unrolling of the stock when the motor 180 is de-actuated.

Once the filler strip stock 95 has been threaded as above described, it is merely necessary to actuate the motor 180 and the drum assembly 130 and apply the filler strips about the periphery of the tire. Once the desired length has been applied, the stock can be severed, spliced, and the remainder of the building operation can take place.

The chain and sprocket driving connection 181 between drive means 180 and the shafts has not been described in detail since it is believed apparent that while a chain and sprocket drive is illustrated, other suitable means can be devised.

It should be noted also, as above mentioned, that the mechanism just described is only utilized when the "valley" type of tread shown in FIGS. 3 and 4 is being built.

THE TREAD STOCK LET-OFF MEANS 30

Figure 14:
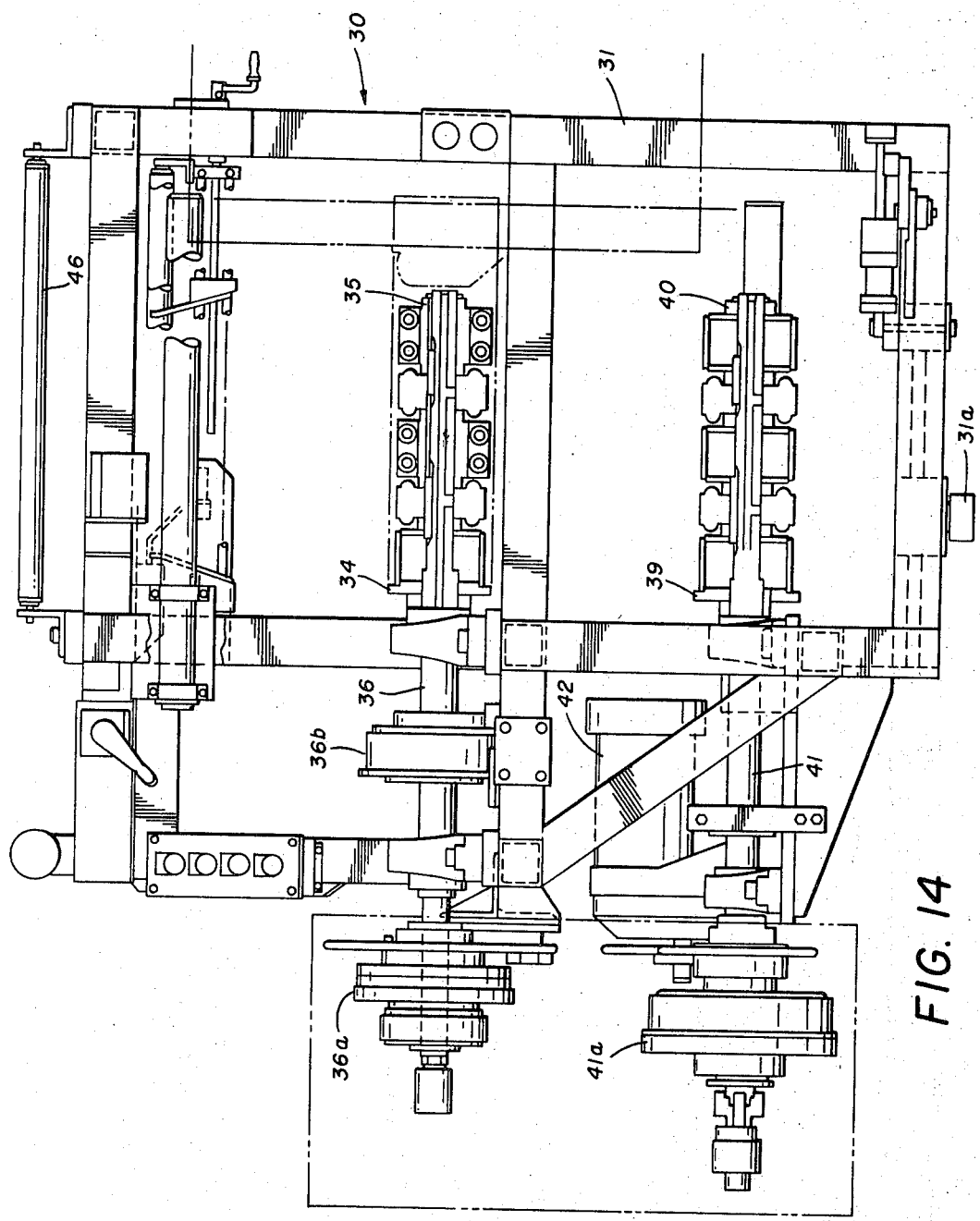
FIG. 14 is a view taken along the lines 14—14 of FIG. 5.

Turning next then to FIGS. 5, 7, and 14 for a detailed description of the tread stock let-off means 30, it will be first noted that in the general unwinding or feeding operation, this mechanism operates quite similarly to that of the filler strip let-off means 90.

Accordingly, shells 34 and 35 are mounted on a shaft 36 which is, in turn, carried on the frame of the tread stock let-off device 31. These shells 34 and 35 receive the roll 32 which carries the tread stock material 33 and also separating material or liner 37.

The liner take-up roll 38 is carried on the tread stock let-off frame 31 and is journaled on shells 39 and 40, which are carried on rotatable shaft 41, for rotational movement in response to motor 42 and chain and sprocket drive means 43, as will be explained more fully below.

Also journaled for rotational movement on the frame 31 of the tread stock let-off means 30 are a series of three conveyor rollers 44, 45, and 46. The tread stock 33 and the liner or separating material 37 is first pulled from the roll 32, passed over the roller 44, and then the separating material or liner 37 is passed under roll 45 and onto the take-up roll 38. The tread stock 33 is permitted to form a loop, and then the leading edge thereof is passed over the roll 46 and onto the movable conveyor 50. In this manner, during unwinding, the principal pull or tension is taken by the liner 37, since the take-up roll 38 is driven, thereby avoiding any distortion or stretching of the tread stock material 33.

In order to ensure the proper rate of feed and also to alert the operator when the roll 32 is empty, first and second photo-electric stop switches 47 and 48 are provided with each switch having an associated photo-electric receiver. Thus, when the loop in the bottom of the tread stock 33 rises above the switch 48, the motor 42 and drive 43 are activated, and an additional amount of tread stock can be run off the drum 32. This action is similar to the common utilization of a festoon in conjunction with photo-electric cells.

Similarly, when the stock loop rises above the switch 47, the switch 47 will deactivate the motor, thereby preventing further feed. Also, when the end of the roll is reached, the photo-electric switch 47 is activated, thereby stopping the feed and indicating to the operator at the opposite end of the machine that it is time to change rolls.

It should be noted that shaft 36 has clutch 36a associated therewith as well as brake 36b, while shaft 41 also has a clutch 41a, with the operation of these components being described more fully below.

Referring again to FIGS. 5 and 7, it will be noted that the frame 31 for the tread stock let-off mechanism 30 is journaled on shaft 21a which is carried by the main frame. The fact that the frame 31 is journaled on this shaft permits it to move transversely of the main frame 10 in response to the drive means 150, which will be subsequently explained in greater detail.

At this point it is sufficient to note that an adjustment member 49 is provided on the main frame, and by means of turning the hand wheel 49a, the position of the tread stock let-off frame 31, with relation to the main frame and the movable conveyor 50, can be adjusted laterally by means of threaded shaft 49b. In this fashion preliminary alignment is achieved to compensate for various sizes of tires, with it being understood that this alignment is a rough alignment and that additional fine alignment means are provided.

Mounted on the bottom of frame 31 is a cam follower or roller 31a which rides along plate 25 of extensions 11a, 11a of main frame 10 for improved stability during the time the tread stock let-off means 30 is moving transversely of the frame.

Finally and as noted earlier, a motor 41 is carried on the frame 31 of the tread stock let-off means and provides driving power for the roll 32 and the roll 38 through chain and sprocket means 43, as best shown in FIG. 5, No detailed explanation of this structure has been set forth here since a simple belt or chain-type drive is contemplated except to note, as above, that clutch and brake assemblies 36a and 36b and 41a are provided in conjunction with shafts 36 and 41, respectively.

THE MOVABLE CONVEYOR ASSEMBLY 50

Turning next then to FIGS. 5, 7, 8, and 10 for a detailed examination of the movable conveyor 50, it will be noted that the same is basically a roller type conveyor which includes a frame 51, one end thereof being attached to the frame 31 of the tread stock let-off means 30, while the other end is mounted directly on cross shafts 21a, 21a for transverse movement relatively of the main frame 10 (see particularly FIG. 10).

This conveyor assembly 50 is generally rectangular in plan with a plurality of transverse rollers 52, 52 mounted for rotational movement between opposed elongate side frame members 53, 53 and transverse end members 54, 54.

Movement of the movable conveyor 50 is controlled by the drive means 140, which will be explained in greater detail below.

It should also be noted at this point that the conveyor 50, in addition to the components already mentioned, does contain guide rails 55 and 56 which serve to ensure alignment of the strip as it is passed across the top of the roller. Generally, the guide rail 55 is fixed in position on the conveyor, while the guide rail 56 is movable transversely of the conveyor 50 by means of two slot pins 57, 57 (see FIG. 7).

THE DRIVE AND CONTROL MEANS 140, 160, 170

Turning next then to the means for driving the movable conveyor 50 and the tread stock supply means 30 transversely of the main frame 10, attention is first called to FIGS. 7 and 10. Referring particularly to FIG. 7, it will be noted that the drive means 140 are mounted on a frame 141 and consist of the motor 142 with a clutch 144 and appropriate chain drive connections 143 to the shaft 145. In the form of the invention illustrated, this drive connection is in the form of a chain and sprocket.

The shaft 145 is journaled on the top of frame 141 in a pillow block 146 and is connected to input shaft 147 by coupling 148. Shaft 147 is, in turn, carried on the top frame element 12 of the main frame 10 and extends beneath the movable conveyor 50. The drive shaft or input shaft 147 terminates in a right angle gear 149, which is attached to a lead screw 150 and a lead nut 151. The lead screw 150 is mounted at its opposed ends in bearing blocks 152, 152 which are, in turn, mounted on cross pieces 153, 153 which are secured to the main frame 10. (See FIG. 9.)

In operation, actuation of the motor 142 will drive the input shaft 147 and turn the screw 150 by means of the right angle drive 149.

Projecting from the top of lead nut 151 is a roller 154 which is received in groove 155a of bar 155 which is pivotally connected to the nut by pivot pin 155b. The opposed end of the bar 155 rides in guide member 156, which is mounted on the movable conveyor 50.

The angle of the rod 155 with relation to the guide 156 can be altered by means of adjustment and control means 160 shown best in FIGS. 9 and 10. These adjustment means consist of a threaded shaft 161 carried by pillow block 164 on the side of conveyor 50 and operated by a hand wheel 161a on one end, and with the other end being pivotally connected to the bar 155 by swivel block 162. Turning the shaft 161 will change the angle of the bar 155 with respect to the longitudinal axis of the conveyor as shown in FIG. 7. In this way travel of the movable conveyor 50 will be controlled. Stated otherwise, the control or adjustment means 160 controls the speed of traverse of the movable components of the overall apparatus, and thus controls the number of wraps. This also controls the step-off distance which is intended to be uniform for each wrap. It should be noted here that the guide means 156 and the angle bar 155 do not move relatively of each other during operation and that the bar is set, in FIG. 7, at its maximum helix angle which would result in the greatest step-off and thus in a fast traverse.

Adjustment means 160 also includes a second bar or shaft 163 which carries degree indicia (not shown) on its surface so that the precise degree of adjustment of the bar 155 can be ascertained.

A still further adjustment means 170 is provided on the main frame 10, with this means consisting again of a threaded shaft 171 mounted on bracket 171a and a control hand wheel 172. The end of the shaft 171 that is opposed to the hand wheel 172 is mounted in a block 173 so that the precise starting point for the operation can be controlled by simply turning the handle 172, which moves the entire mechanism relatively of the main frame.

Adjustment means 170 also includes a linear reading bar 174 mounted in overlying relationship to shaft 171 to enable measurement of the movement caused by turning handle 172.

In operation, actuation of the motor 142 will, of course, cause the input shaft 147 to rotate and, by virtue of the right angle gear 149, rotation will be transmitted to the lead screw 150, and the nut 151 will be driven along the screw. Since roller 154 is received in the groove 155a of the bar 155, this roller will be driven along the groove, thereby driving the conveyor 50 across the main frame 10. The predetermined angle of the bar 155 which, of course, as mentioned above, is controlled by adjustment means 160, will control the speed with which the conveyor moves.

THE STITCHING MEANS 70

The stitching means 70, which are best shown in FIGS. 5 and 7, include a frame 70a which is carried on the end of movable conveyor 50 for movement therewith transversely of main frame 10. Arm 74 is pivotally mounted at one end on roller 74a of conveyor 50 and has its opposed end pivotally secured to a first piston 73 at 73a.

An A-frame 76 projects from the top of conveyor 50 and carries second piston 75 which has the end of its rod 75a pivoted to arm 74 intermediate its ends at 75b. Similarly, the rod 73b of first piston 73 is pivoted to a forwardly projecting portion of arms 77, 77 which are also journaled on roller 74a.

Referring to FIG. 5 it will be seen that when pistons 73 and 75 are extended to the full line position, the bladder 71 which rotates between arms 77, 77 will be in stitching contact with the strip 33. When the pistons retract, the entire assembly is pulled up to the broken line position for rethreading or any other operation requiring access to the front of the unit.

THE DRUM 130

The building machine 130 can be any one of several commercially available models and will only be described in general terms. Thus, the collapsible drum 132 is mounted on a support 131 and is positioned at the right end of the unit as shown in FIG. 5 and is connected to motor 142 by chain drive 133 in known fashion.

OPERATION OF THE IMPROVED APPARATUS

In order to operate this apparatus to achieve a predetermined size and shape or tread profile, the settings for the machine must first be computed by certain calculations.

Thus, and assuming that a tire is to be strip wound to achieve a flat profile in the center region, and assuming again that the tread is to be calculated for a 12.00–24 tire, computations can be made in any one of three manners. First, and assuming that the operator has only a strip with a fixed dimension of 4 inches by .150 inches available, the computation would be as follows:

$$\text{Number of layers} = \frac{\text{Tread thickness}}{\text{Strip thickness}} = \frac{.940}{.150} = 6.25$$

$$\text{Step-off} = \frac{\text{Strip width}}{\text{Number of layers}} = \frac{4}{6.25} = .64$$

Using this method, no account is taken of the slope of the tread and, therefore, under this method the tread thickness cannot be exact.

There is a second method in which, assuming that the tread thickness is 30/32 and taking a given strip thickness of 5/32 then:

$$\text{Number of layers} = \frac{\text{Tread thickness}}{\text{Strip thickness}} = \frac{30/32}{5/32} = 6$$

Therefore:

$$\text{Step-off} = \frac{\text{Width of slope}}{\text{Number of layers}-1} = \frac{4\frac{1}{4}}{6-1} = .85$$

Therefore: Strip width=Slope+Step-off=4¼+.85=5.1 in.

The above method produces a perfect tread.

There is a third modified method which can be used when the strip thickness will vary, and this will be cheaper in the long run since the necessity of producing and storing a wide variety of strip thicknesses will be eliminated.

If we assume any given strip thickness, such as .140, then:

$$\text{Number of layers} = \frac{\text{Tread thickness}}{\text{Strip thickness}} = \frac{.940}{.140} = 6.7$$

(It is, of course, impossible to have a fractional number of layers, and the above figure is an approximation.)

$$\text{Step-off} = \frac{\text{Width of slope}}{\text{Number of layers}-1} = \frac{4\frac{1}{4}}{6.7-1} = .75$$

Width of strip=Width of slope+Step-off=4¼+.75=5.0.

A hypothetical tread profile can also be calculated in the following manner.

Assuming that a tread thickness of 1.22 inches is required, then the tread strip thickness will be a division of 1.33 or 0.148, which is 1/9 of the tread thickness.

Accordingly, the number of layers required is 9(1.33/.148).

Assuming that the selected tread profile requires a six-inch slope width on each edge, then:

$$\text{Step-off} = \frac{\text{Slope width}}{\text{Number of layers}-1} = \frac{6}{9-1} = .75$$

It then becomes possible to determine the width of the strip required, which in this example is equal to the slope width plus the step-off or 6.75 inches.

Since the number of convolutions will be equal to the crown plus the slope divided by the step-off, and assuming that in addition to the slope the total tread width requires an additional 17 inches in the crown area, then by dividing 17 plus 6 by .75, the result is 30.6 or approximately 31 convolutions.

Accordingly, and as will be seen from FIGS. 1 and 3 of the drawings in winding this particular tread, the slope is formed from the first wrap to the ninth wrap, while from the ninth wrap to the last wrap the thickness remains constant, and from the twenty-seventh wrap to the last wrap the opposite slope is formed.

By mathematical calculations, which do not necassarily form a part of this invention, for any given width and thickness of strip and any given specification for the finished tread, it is simply necessary to adjust the hand wheel 161a of the adjustment means 160 to change the angle of the bar 157. This controls both the step-off and the speed of traverse, thereby controlling the wrapping of the tread so that the ultimate tread meets the predetermined specifications.

Assuming then that the calculations have been made, and it is to be understood, of course, that these could be predetermined so that with a given strip width and thickness and a given tread specification, the operator can merely turn the hand wheel 161a and read on the bar 163 the appropriate reading. Then, and assuming that the control handle 172 has been turned to achieve the proper starting point with regard to the tire, the operator is ready to begin.

CONTROL SEQUENCE

Assuming that the machine is loaded and threaded as shown in FIG. 5, and that the stitcher 70 is in the up or broken line position of FIG. 5, the leading end of the strip 33 can be put in contact with the tire carcass on the building drum. The main power switch will be closed to motor 180, 42, and 142, which are the filler stock motor, the tread stock motor, and the main drive motor, respectively. The push button 300 is then actuated to furnish power to a signal light 301 and to energize the control relay 302, which will close the normally open contacts 302a, 302b, and 302c. Contacts 302a and 302b furnish power to the filler strip let-off device, the photo-switch light sources and the photo-electric switches 47 and 48 for the upper and lower control of the tread strip let-off device 30.

Considering again then the light source 48, which is located at the bottom of the strip stock loop (see FIG. 5), the relay to motor 42 is energized when the stock raises to the position above the photo-electric switch. Similarly, photo-electric switch 47, which includes a light source, is located near the top of the loop and serves to de-energize the relay to motor 42 when the last of the stock has been used from the tread stock roll 32.

Closing of normally open contacts 302a and 302b by operation of the push button 300 also furnishes power to the controls for the stitching device, the transverse motion of the movable conveyor 50, and rotation of the building drum.

When the tread strip is properly threaded, the lower photo-electric switch 48 is de-energized, providing of course that the loop is below the light source. The upper photo cell 47 is also de-energized at this time. Upon starting the device, the normally open push button 303 closes its contacts to energize solenoid 304a of the valve 304 which actuates the rod in the second cylinder 73 outwardly. Simultaneously contacts 303a are open which de-energizes solenoid 304b.

Also with the arm 74 of the stitcher 70 in the up position, limit switch 305 will be closed and actuated. Upon closing of switch 305, relay 307 is also energized in order to close normally open contracts 307a and interlock on the control panel (not shown).

Assuming that selector switch 306 is in the down position, its contacts are closed, and contact 306a remains open. Since the selector switch contacts are closed, normally closed contacts 308a will energize solenoid 309a of the valve 309 to actuate the rod of the cylinder 73, thereby pressing the pneumatic stitching device 70 and the roll 71 thereof into engagement with the strip 33, which has been previously placed on the drum 132 in starting position.

Either prior to the actuation of push button 303 or following the above-outlined control steps with selector switch 311 in the "jog" position, selector switch 310 would normally be turned to the automatic position, thereby closing contacts 310a and 310c and simultaneously opening contacts 310b and 310d, thereby energizing the relay to motor 190 through closed contacts 310a. Closed contact 310c puts the automatic control of the clutch 41a, which is associated with the rewind roll 38, on the normally open contact 312 of the lower photo-electric switch 48 which activates the drive mechanism for the rewind roll when the lower loop of the strip material 33 raises above the normal position. As mentioned before, when the loop does raise above normal, the contacts 312 of the switch 48 close, thereby energizing solenoid 313a of valve 313 to engage the pneumatic clutch and drive the wind-up roll 38 so that both liner and strip stock material come from the roll 32 simultaneously.

Simultaneously with closing of the contacts 312 by movement of the loop above the normal position, contacts 314 open, but solenoid 313b remains energized to release the pneumatic brake 36b on the stock roll 32. The actions which result from the operation of solenoid 313a and 313b are intermittent due to the lower photoelectric switch 48, which alternates the simultaneous opening and closing of contacts 312 and 314 depending upon the position and location of the strip 33.

In the event that a strip size change is required, such as when the roll is not completely used up and a change in tire size or tread specification occurs, it is necessary to rewind the unused portion of the strip 33 onto the drum 32. At this point it would be necessary to turn selector switch 310 to the "hand" position so that contacts 310a and 310c will remain open, while contacts 310b and 310d are closed.

The rewind operation can be performed by turning selector switch 311 to the rewind position which will then disengage the clutch on the rewind roll 38 and also the brake on the stock roll 32, so that the rewind can be accomplished by motor 42. Push button 315 provides a safety stop to solenoid 313a and solenoid 313b. A further safety stop is provided by a mechanical detent stop 316, and its associated contacts 316a, 316b, and 316c, which will stop the entire device including the tread stock let-off, the traverse and the gear motor. This controls the outer limit of travel of conveyor assembly 50. Once this button has been pushed, selector switch 316 must then be reset before reusing the traverse start button 317. At this point, and assuming again that the stock has been threaded and the control procedures outlined to this point have been followed, the machine is then ready for operation.

Accordingly, push button 317 is actuated which energizes a time delay relay 318 and the forward relay 319 for the motor 142 through the normally closed contacts between the power sources. Energizing the motor forward relay 319 closes holding contacts 319a around push button 317 and energizes the time delay relay 318 which closes contacts 318a to energize a torque relay 320 which will control the initial slow starting speed of the motor 142 during the time for which the delay has been set.

Because the motor 142 drives both the building drum and the transverse movement of the movable conveyor 50, the winding of the strip 33 onto the tire carcass is accomplished and controlled by the traversing movement.

At the end of the predetermined traversing movement. limit switch 321 is closed and limit switch 321a is open. Upon actuation of these switches relay 308 is energized, opening the normally closed contacts 308a and 308b. Open contact 308 de-energizes the relay 319, thereby stopping the motor 142, and the opening of contact 308a energizes the solenoid 309a of valve 309 which operates the cylinder 73 of the stitching mechanism 70.

Simultaneously with the aforementioned energizing of contact 308 by limit switch 321, solenoid 309b is energized to reverse the action of the cylinder 73 which will raise the stitching roll 71 out of engagement with the completed tire carcass on the drum 132.

Push button 322 is then actuated, thereby opening contact 322a to de-energize the solenoid 304a and close contacts 322b thereby energizing solenoid 304b to reverse the direction of the cylinders 75 and 73, thereby elevating the stitcher applicator to the starting position. With the upward movement of the arm 74, limit switch 79 is opened de-energizing contact 307 and opening contacts 307a, thereby de-energizing solenoid 323 which releases the drum drive forward clutch. Furthermore, when the arm 74 is raised to the upper or start position, limit switch 78 closes, thereby energizing motor reverse contact 325 to open the contacts 325a to reverse the motor 142 which returns the movable conveyor 50 to its starting position, completing the cycle and placing the device in position for a new cycle.

When a valley-type tread is required, such as shown in FIGS. 3 and 4 of the drawings, selector switch 326 is turned to the automatic position following energizing of contact relay 302 by push button 300. With the selector switch 326 in the automatic position, contacts 326a and 326c close, while simultaneously contacts 326b and 326d are open. Closed contact 326a energizes contact relay 327 to operate the motor 180, while closed contact 326c energizes solenoid 328a of the valve 328 to engage the clutch 107 on the wind-up roll 100. If the festoon 97 of the filler stock material 95 is at the bottom, the limit switch 102 is opened and the relay 327 is de-energized to stop the motor 180. When it is necessary to "jog" after threading the filler stock or rewind when required, selector switch 326 is put in the "hand" position, following which push button 330 can be used to intermittently engage the solenoid 328a or, in the case of the rewind, push button 331 can be held open to simultaneously de-energize solenoid 328a and energize solenoid 328b to engage the clutch 105 on the stock roll 93.

To apply the filler strips 95 to the carcass on the drum 132, the operator simply takes the leading ends from the conveyor 110 and attaches them to the tacky surface of the carcass. He then actuates the drum one revolution, following which, of course, the strips are cut to proper length and the ends are spliced together. The controls mentioned above effectively prevent any overrun or tearing of the filler stock 95.

It has accordingly been shown how a new fast and economic tire building method and apparatus has been produced in that a tread can be simply and quickly wound onto a tire in a single pass of the conveyor along the axis of the tire, with the resulting tread being capable of being produced within extremely close tolerances so that a greatly improved final result is achieved.

It has been shown by the foregoing how many of the difficulties commonly encountered with regard to conventional tread manufacture, such as shrinkage, storage, poor splices. etc. have been eliminated.

It should be kept in mind throughout that the invention is not intended to be limited in any way to new tires but can be used for retreading purposes as well. Furthermore, the actual drum unit 130 can be any one of several conventional tire building drums.

While a full and complete description of the invention has been set forth in accordance with the dictates of the patent statutes, modifications may be resorted to without departing from the spirit hereof or the scope of the appended claims.

The embodiments of the invention in which an exclusive property or privilege is claimed are defined as follows:

1. An apparatus for building a tread on a tire carcass comprising
    means for applying axially spaced strips of filler material to the periphery of the carcass;
    means for applying the leading end of a strip of tread stock of predetermined dimensions to the surface of the carcass;
    means for rotating the carcass at a fixed speed;
    means for continuously traversing the tread stock strip axially of the carcass with a constant step-off in only one direction continuously during carcass rotation, and over the filler material;
    whereby a spiral winding of a predetermined number of layers of the tread stock strip is applied to form a tread of predetermined configuration in a single traverse across the periphery of the carcass.

2. The apparatus of Claim 1 further characterized by the presence of
    (A) means for stitching said tread stock while the same is being applied to said tire carcass.

3. The apparatus of Claim 1 further characterized by the presence of
(A) means for aligning said tread stock with respect to said tire carcass.

4. The apparatus of Claim 1 further characterized by the presence of
(A) stitching means
(1) carried by said tread stock means for movement therewith
(2) and being movable into and out of stitching contact with said tread stock.

References Cited

UNITED STATES PATENTS

| | | | |
|---|---|---|---|
| Re. 25,349 | 3/1963 | Hanson | 156—130 |
| 3,418,191 | 12/1968 | Dieckmann, et al. | 156—130 |
| 2,365,341 | 12/1944 | Haren, et al. | 156—406 |
| 1,335,879 | 4/1920 | Darrow | 156—130 |
| 3,595,724 | 7/1971 | Leblond | 156—415 |
| 3,355,339 | 11/1967 | Hineline | 156—405 |
| 3,549,442 | 12/1970 | Hineline | 156—130 |
| 3,497,408 | 2/1970 | Hineline | 156—130 |
| 3,748,203 | 7/1973 | Greene | 156—128 |
| 1,925,894 | 9/1933 | Barder, et al. | 156—111 |
| 3,607,517 | 9/1971 | Pelley, et al. | 156—432 |
| 3,373,066 | 3/1968 | Hindin | 156—128 |

FOREIGN PATENTS

| | | | |
|---|---|---|---|
| 528,335 | 10/1940 | Great Britain | 156—128 R |

DANIEL J. FRITSCH, Primary Examiner

J. E. KITTLE, Assistant Examiner

U.S. Cl. X.R.

156—130, 397